US012625113B2

(12) United States Patent
Jiang

(10) Patent No.: US 12,625,113 B2
(45) Date of Patent: May 12, 2026

(54) ULTRASONIC TRANSDUCING MODULE AND ULTRASONIC PROBE

(71) Applicant: Qisda Corporation, Taoyuan City (TW)

(72) Inventor: Fu-Sheng Jiang, Taoyuan City (TW)

(73) Assignee: Qisda Corporation, Taoyuan City (TW)

( * ) Notice: Subject to any disclaimer, the term of this patent is extended or adjusted under 35 U.S.C. 154(b) by 524 days.

(21) Appl. No.: 18/189,207

(22) Filed: Mar. 24, 2023

(65) Prior Publication Data

US 2024/0019406 A1     Jan. 18, 2024

(30) Foreign Application Priority Data

Jul. 14, 2022     (CN) .......................... 202210831440.6

(51) Int. Cl.
*G01N 29/24*          (2006.01)
(52) U.S. Cl.
CPC ................................ *G01N 29/2437* (2013.01)
(58) Field of Classification Search
None
See application file for complete search history.

(56) References Cited

U.S. PATENT DOCUMENTS

| | | | | |
|---|---|---|---|---|
| 11,638,571 B2 * | 5/2023 | Suzuki | .................... | A61B 8/461 |
| | | | | 600/459 |
| 2018/0344287 A1 * | 12/2018 | Nakai | .................... | H04R 17/00 |
| 2020/0246829 A1 * | 8/2020 | Hakkens | .............. | B06B 1/0292 |
| 2022/0381907 A1 * | 12/2022 | Kyogoku | .............. | G01S 7/5208 |

FOREIGN PATENT DOCUMENTS

| | | |
|---|---|---|
| CN | 103418542 | 12/2013 |
| CN | 106901777 | 6/2017 |
| CN | 110008929 | 7/2019 |
| CN | 209077097 | 7/2019 |
| CN | 112839591 | 5/2021 |
| CN | 216094664 | 3/2022 |
| CN | 114287966 | 4/2022 |
| CN | 114652344 | 6/2022 |
| EP | 3520706 | 8/2019 |

OTHER PUBLICATIONS

"Office Action of Taiwan Counterpart Application", issued on Apr. 13, 2023, p. 1-p. 7.
"Office Action of China Counterpart Application", issued on Sep. 17, 2025, p. 1-p. 9.

* cited by examiner

*Primary Examiner* — Suman K Nath

(74) *Attorney, Agent, or Firm* — JCIPRNET

(57)          ABSTRACT

An ultrasonic transducing module, including a base, a piezo-electric ultrasonic transducer, and a micromachined ultra-sonic transducer, is provided. The piezoelectric ultrasonic transducer is disposed on the base. The micromachined ultrasonic transducer is disposed on the piezoelectric ultra-sonic transducer. The piezoelectric ultrasonic transducer is disposed between the base and the micromachined ultra-sonic transducer. An ultrasonic wave emitted by the piezo-electric ultrasonic transducer penetrates the micromachined ultrasonic transducer and is then transmitted to the outside. An ultrasonic probe is also provided.

20 Claims, 5 Drawing Sheets

ULTRASONIC TRANSDUCING MODULE AND ULTRASONIC PROBE

CROSS-REFERENCE TO RELATED APPLICATION

This application claims the priority benefit of China application serial no. 202210831440.6, filed on Jul. 14, 2022. The entirety of the above-mentioned patent application is hereby incorporated by reference herein and made a part of this specification.

BACKGROUND

Technical Field

The disclosure relates to a transducer and a probe, and in particular to an ultrasonic transducing module and an ultrasonic probe.

Description of Related Art

The ultrasonic transducer is a transducer that converts sound energy and electrical energy within the ultrasonic frequency range. The ultrasonic transducer may be mainly divided into three types, 1. transmitter; 2. receiver; and 3. transceiver transducer. The transducer for launching an ultrasonic wave is referred to as the transmitter. When in a transmitting state, the transducer converts electrical energy into mechanical energy and then into sound energy. The transducer for receiving a sound wave is referred to as the receiver. When in a receiving state, the transducer converts sound energy into mechanical energy and then into electrical energy. In some cases, the transducer may be used as both the transmitter and the receiver, and is referred to as the transceiver transducer. The transceiver transducer is the core content of ultrasonic technology and one of the key technologies, and is widely applied in fields such as non-destructive testing, medical imaging, ultrasonic microscope, fingerprint recognition, and the Internet of Things.

When the traditional ultrasonic transducer detects a human body, the frequency and the resolution of the ultrasonic wave used are different in response to the requirements of different tissues or parts to be detected (for example, the heart, carotid artery, abdomen, etc.). At this time, whenever ultrasonic image detection is performed on a different part, a different ultrasonic transducer often needs to be replaced, which causes inconvenience in use and increases costs of equipment.

SUMMARY

The disclosure provides an ultrasonic transducing module, which has a wide range of functions.

The disclosure provides an ultrasonic probe, which has a wide range of functions.

An embodiment of the disclosure provides an ultrasonic transducing module, which includes a base, a piezoelectric ultrasonic transducer, and a micromachined ultrasonic transducer. The piezoelectric ultrasonic transducer is disposed on the base, and the micromachined ultrasonic transducer is disposed on the piezoelectric ultrasonic transducer. The piezoelectric ultrasonic transducer is disposed between the base and the micromachined ultrasonic transducer, and an ultrasonic wave emitted by the piezoelectric ultrasonic transducer penetrates the micromachined ultrasonic transducer and is then transmitted to an outside.

An embodiment of the disclosure provides an ultrasonic probe, which includes a hand grip, a piezoelectric ultrasonic transducer, and a micromachined ultrasonic transducer. The hand grip has a first end and a second end, the piezoelectric ultrasonic transducer is disposed on the first end of the hand grip, and the micromachined ultrasonic transducer is disposed on the piezoelectric ultrasonic transducer. An ultrasonic wave emitted by one of the piezoelectric ultrasonic transducer and the micromachined ultrasonic transducer closer to the second end penetrates other one of the piezoelectric ultrasonic transducer and the micromachined ultrasonic transducer farther away from the second end and is then transmitted to an outside.

In the ultrasonic transducing module and the ultrasonic probe of the embodiments of the disclosure, the stacked piezoelectric ultrasonic transducer and micromachined ultrasonic transducer are adopted, and the piezoelectric ultrasonic transducer and the micromachined ultrasonic transducer may be used for sensing or outputting different ultrasonic waves. Therefore, the ultrasonic transducing module and the ultrasonic probe of the embodiments of the disclosure have a wide range of functions.

DETAILED DESCRIPTION OF DISCLOSED EMBODIMENTS

Figure 1:
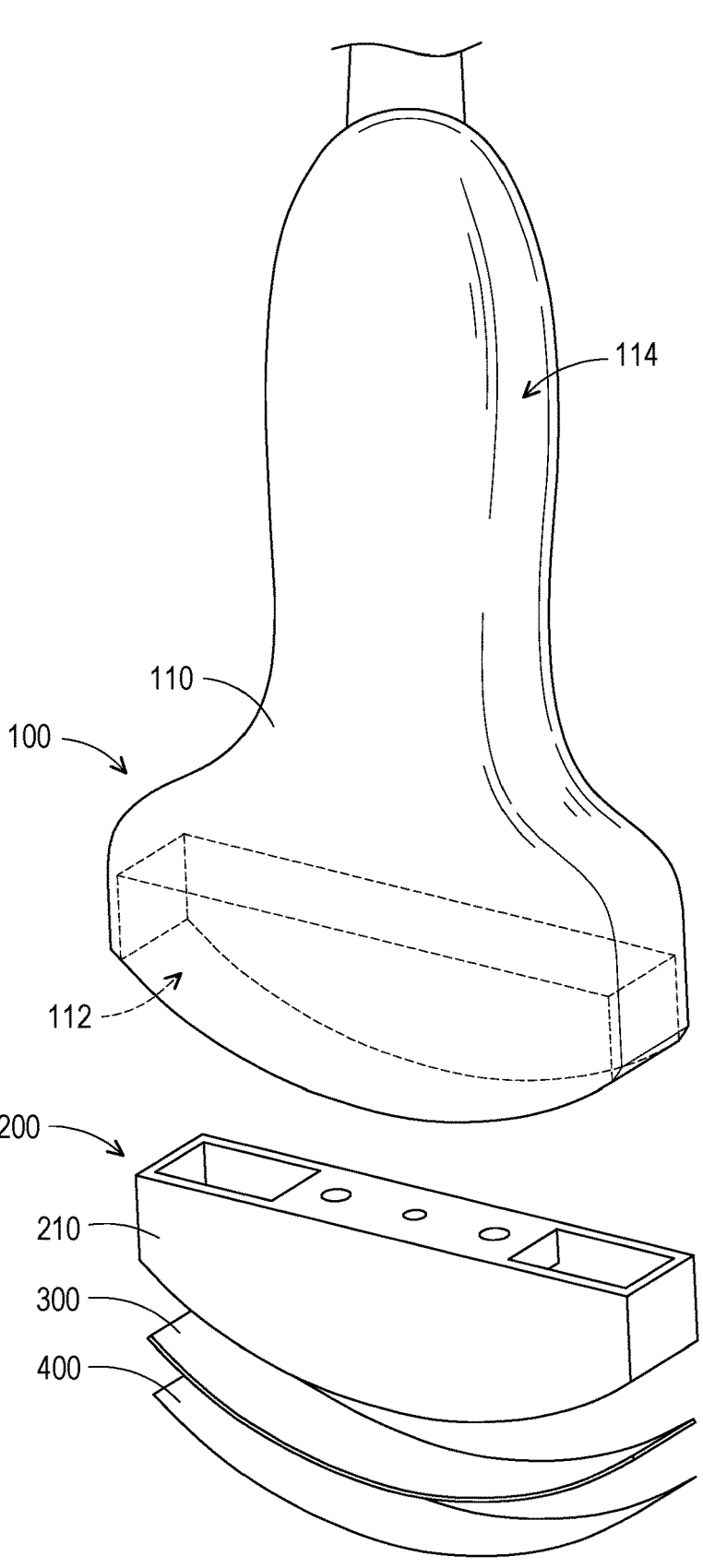
FIG. 1 is an exploded schematic view of an ultrasonic probe according to an embodiment of the disclosure.
Figure 2A:
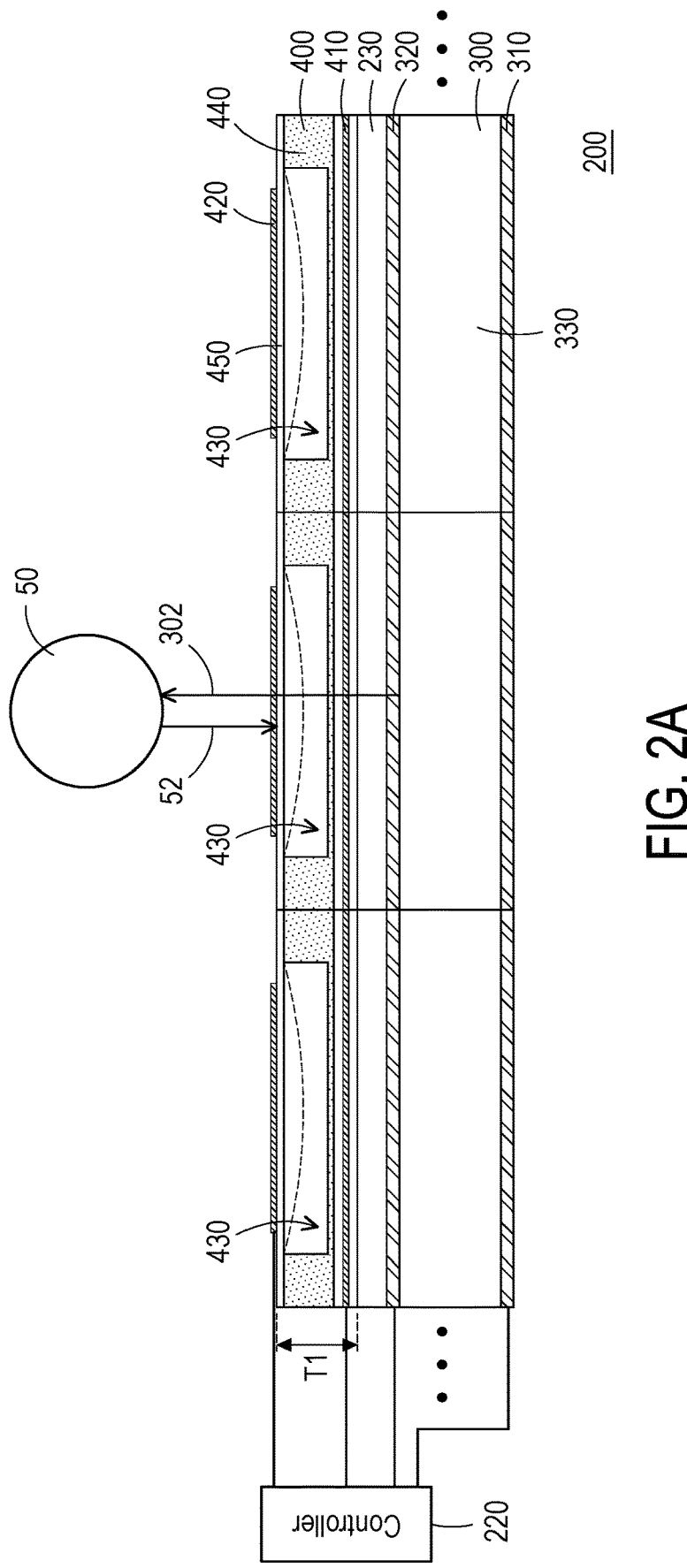
FIG. 2A is a cross-sectional schematic view of an ultrasonic transducing module in FIG. 1 according to an embodiment.

FIG. 1 is an exploded schematic view of an ultrasonic probe according to an embodiment of the disclosure, and FIG. 2A is a cross-sectional schematic view of an ultrasonic transducing module in FIG. 1 according to an embodiment, wherein a base of the ultrasonic transducing module in FIG. 2A is not shown, and the base may be referred to FIG. 1. Please refer to FIG. 1 and FIG. 2A. An ultrasonic probe 100 of the embodiment includes a hand grip 110, a piezoelectric ultrasonic transducer 300, and a micromachined ultrasonic transducer 400. The hand grip 110 has a first end 112 and a second end 114, the piezoelectric ultrasonic transducer 300 is disposed on the first end 112 of the hand grip 110, and the micromachined ultrasonic transducer 400 is disposed on the piezoelectric ultrasonic transducer 300. An ultrasonic wave 302 emitted by one of the piezoelectric ultrasonic transducer 300 and the micromachined ultrasonic transducer 400 closer to the second end 114 (for example, the piezoelectric ultrasonic transducer 300 in FIG. 1 and FIG. 2A) penetrates the other one of the piezoelectric ultrasonic transducer 300 and the micromachined ultrasonic transducer 400 farther away from the second end 114 (for example, the micromachined ultrasonic transducer 400 in FIG. 1 and FIG. 2A) and is then transmitted to the outside.

In the embodiment, the piezoelectric ultrasonic transducer 300 is disposed between the hand grip 110 and the micromachined ultrasonic transducer 400. However, in other embodiments, the micromachined ultrasonic transducer 400 may also be disposed between the hand grip 110 and the piezoelectric ultrasonic transducer 300. In the embodiment, an ultrasonic transducing module 200 may be disposed on the first end 112 of the hand grip 110, and the ultrasonic transducing module 200 includes a base 210, the piezoelectric ultrasonic transducer 300 and the micromachined ultrasonic transducer 400. The piezoelectric ultrasonic transducer 300 is disposed on the base 210, and the micromachined ultrasonic transducer 400 is disposed on the piezoelectric ultrasonic transducer 300. The piezoelectric ultrasonic transducer 300 is disposed between the base 210 and the micromachined ultrasonic transducer 400, and the ultrasonic wave 302 emitted by the piezoelectric ultrasonic transducer 300 penetrates the micromachined ultrasonic transducer 400 and is then transmitted to the outside.

In the embodiment, the micromachined ultrasonic transducer 400 is, for example, a capacitive micromachined ultrasonic transducer (CMUT) or a micro-element manufactured by microelectromechanical process technology and is manufactured on a silicon base, glass, or a flexible base, such as SU-8 thick film photoresist, polydimethylsiloxane (PDMS), and polyimide (PI), and the piezoelectric ultrasonic transducer 300 is, for example, a lead zirconium titanate (PZT) ultrasonic transducer or a single crystal ultrasonic transducer. In addition, in the embodiment, the micromachined ultrasonic transducer 400 is a thin-film micromachined ultrasonic transducer, and the piezoelectric ultrasonic transducer 300 is in a sheet shape. In an embodiment, a thickness T1 of the micromachined ultrasonic transducer 400 falls within a range of 1 micron to 10 microns.

In the embodiment, the piezoelectric ultrasonic transducer 300 is curved. In addition, in the embodiment, the micromachined ultrasonic transducer 400 has to be flexible. Therefore, the micromachined ultrasonic transducer 400 may be curved along with the piezoelectric ultrasonic transducer 300, and the piezoelectric ultrasonic transducer 300 and the micromachined ultrasonic transducer 400 are disposed on a curved surface of the base 210, so as to effectively expand the sensing range. However, in another embodiment, the piezoelectric ultrasonic transducer 300 may also be planar, and the micromachined ultrasonic transducer 400 may also be planar.

In the ultrasonic transducing module 200 and the ultrasonic probe 100 of the embodiment, the stacked piezoelectric ultrasonic transducer 300 and micromachined ultrasonic transducer 400 are adopted, and the piezoelectric ultrasonic transducer 300 and the micromachined ultrasonic transducer 400 may be used for sensing or outputting different ultrasonic waves. Therefore, the ultrasonic transducing module 200 and the ultrasonic probe 100 of the embodiment have a wide range of functions.

In the embodiment, the piezoelectric ultrasonic transducer 300 includes a piezoelectric layer 330, a first electrode 310, and a second electrode 320. The material of the piezoelectric layer 330 is, for example, lead zirconium titanate, and the piezoelectric layer 330 is disposed between the first electrode 310 and the second electrode 320. When a voltage difference is applied between the first electrode 310 and the second electrode 320, the piezoelectric layer 330 vibrates and emits an ultrasonic wave. On the other hand, when an ultrasonic wave from the outside is transmitted to the piezoelectric layer 330 and vibrates the piezoelectric layer 330, the voltage between the first electrode 310 and the second electrode 320 changes due to the piezoelectric effect. The controller 220 may sense and analyze the voltage change between the first electrode 310 and the second electrode 320, thereby achieving a sensing function of the external ultrasonic wave. The piezoelectric layer 330 and one of the first electrode 310 and the second electrode 320 may be divided into multiple units to form multiple array elements. Alternatively, in another embodiment, the piezoelectric layer 330, the first electrode 310, and the second electrode 320 may not be divided, but form a single array element.

In the embodiment, the micromachined ultrasonic transducer 400 includes a retaining wall 440, a third electrode 410, a fourth electrode 420, and a thin-film 450. The retaining wall 440 is formed with multiple micro-cavities 430, the micro-cavities 430 are located between the third electrode 410 and the fourth electrode 420, the thin-film 450 spans over the micro-cavities 430, and the fourth electrode 420 is disposed on the thin-film 450. The thin-film 450 is, for example, a flexible film that may deform under force. When a voltage change is applied to the third electrode 410 and the fourth electrode 420, the thin-film 450 vibrates and emits an ultrasonic wave due to the electric force line change between the third electrode 410 and the fourth electrode 420. On the other hand, when an appropriate voltage is applied between the third electrode 410 and the fourth electrode 420, an ultrasonic wave from the outside is transmitted to the thin-film 450 to vibrate the thin-film 450, so that the third electrode 410 and the fourth electrode 420 output changing current signals. The controller 220 may control, sense, and analyze an electric signal between the third electrode 410 and the fourth electrode 420, thereby emitting the ultrasonic wave to the outside and achieving the sensing function of the ultrasonic wave. In addition, the fourth electrode 420 may be divided into multiple units along with the micro-cavities 430 to form multiple array elements. The micromachined ultrasonic transducer 400 may be a phase array transducer or a linear or curved transducer.

Please refer to FIG. 2A. The ultrasonic transducing module 200 further includes the controller 220 electrically connected to the piezoelectric ultrasonic transducer 300 and the micromachined ultrasonic transducer 400, such as electrically connected to the first electrode 310, the second electrode 320, the third electrode 410, and the fourth electrode 420. The controller 220 is used to command the piezoelectric ultrasonic transducer 300 to emit the ultrasonic wave 302. The ultrasonic wave 302 penetrates the micromachined ultrasonic transducer 400 to be transmitted to a test object 50. The test object 50 reflects the ultrasonic wave 302 into a reflected wave 52, and the micromachined ultrasonic transducer 400 receives the reflected wave 52. In this way, the test object 50 may be sensed by the micromachined ultrasonic transducer 400. Such an ultrasonic transducing module 200 may be used for thermal monitoring of ultrasonic knife, electric cautery knife, laser acupuncture, phototherapy, etc. For example, the piezoelectric ultrasonic transducer 300 may be used as a high intensity focused ultrasound therapeutic system (HIFU), such as a single array element transducer, and the micromachined ultrasonic transducer 400 may be used to observe a sensing array (that is, a multi-array element) of an ultrasonic image.

In the embodiment, the ultrasonic transducing module 200 further includes a matching layer 230 disposed between the piezoelectric ultrasonic transducer 300 and the micromachined ultrasonic transducer 400, so as to help reduce acoustic resistance encountered when the ultrasonic wave is transmitted between the piezoelectric ultrasonic transducer

300 and the micromachined ultrasonic transducer 400. In addition, in an embodiment, more than 90% of the energy of the ultrasonic wave 302 emitted by the piezoelectric ultrasonic transducer 300 penetrates the micromachined ultrasonic transducer 400 without causing too much energy loss.

Figure 2B:
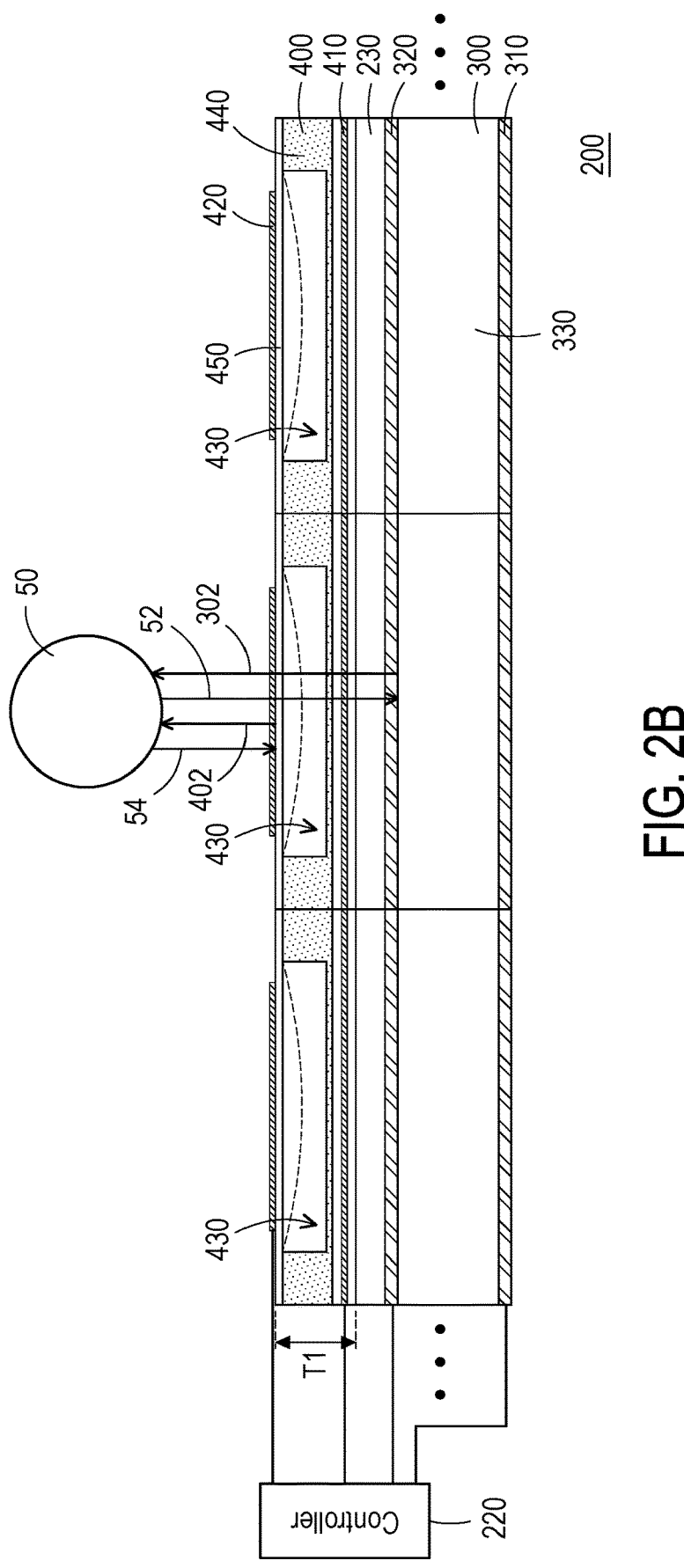
FIG. 2B is a cross-sectional schematic view of another application mode of the ultrasonic transducing module of FIG. 2A.

FIG. 2B is a cross-sectional schematic view of another application mode of the ultrasonic transducing module of FIG. 2A. Please refer to FIG. 2B. In the ultrasonic transducing module 200 of the embodiment, the controller 220 is used to command the piezoelectric ultrasonic transducer 300 to issue a first ultrasonic wave (that is, the ultrasonic wave 302). The first ultrasonic wave penetrates the micromachined ultrasonic transducer 400 to be transmitted to the test object 50. The test object 50 reflects the first ultrasonic wave into a first reflected wave (that is, the reflected wave 52), and the piezoelectric ultrasonic transducer 300 receives the first reflected wave. In addition, the controller 220 is used to command the micromachined ultrasonic transducer 400 to emit a second ultrasonic wave (that is, an ultrasonic 402). The second ultrasonic wave is transmitted to the test object 50. The test object 50 reflects the second ultrasonic wave into a second reflected wave (that is, a reflected wave 54), and the micromachined ultrasonic transducer 400 receives the second reflected wave.

The ultrasonic transducing module 200 of the embodiment may be used as a multi-purpose integrated ultrasonic transducing module. For example, the piezoelectric ultrasonic transducer 300 may be a linear transducer or a curved transducer, and the micromachined ultrasonic transducer 400 may be a phase array transducer or a two-dimensional array transducer. Furthermore, the pitch between the array elements of the piezoelectric ultrasonic transducer 300 may be the same as or different from the pitch between the array elements of the micromachined ultrasonic transducer 400. In addition, when the piezoelectric ultrasonic transducer 300 and the micromachined ultrasonic transducer 400 are both curved transducers, the centers of curvature of the two may be the same or close to each other. The ultrasonic transducing module 200 can achieve the effect of combining diagnosis and treatment, such as positioning collagen and breaking a bubble or a blood-brain barrier with drug administration. Alternatively, during a puncture application, the piezoelectric ultrasonic transducer 300 may be used to observe deeper tissues, the micromachined ultrasonic transducer 400 may be used to observe shallower tissues, and the frequencies of the first ultrasonic wave and the second ultrasonic wave may be different.

Figure 2C:
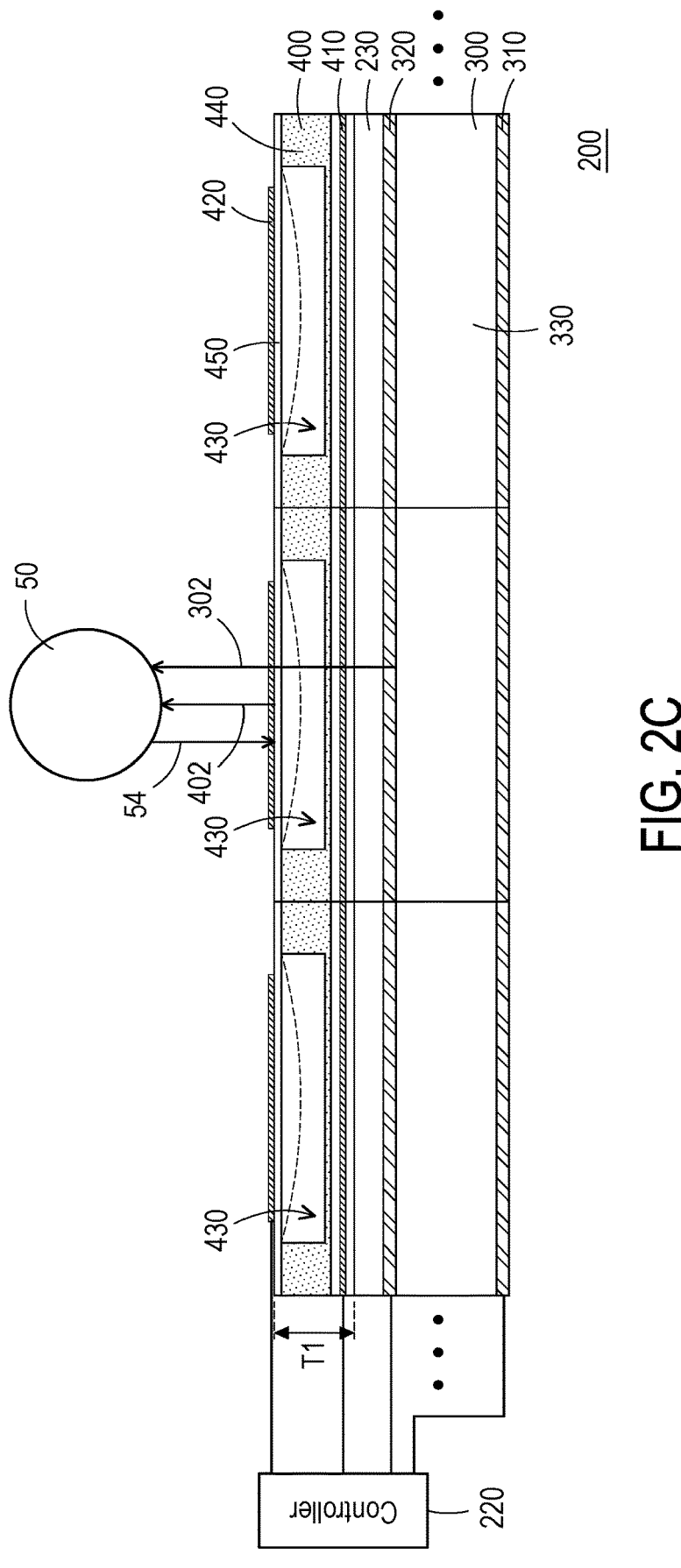
FIG. 2C is a cross-sectional schematic view of yet another application mode of the ultrasonic transducing module of FIG. 2A.

FIG. 2C is a cross-sectional schematic view of yet another application mode of the ultrasonic transducing module of FIG. 2A. Please refer to FIG. 2C. In the ultrasonic transducing module 200 of the embodiment, the controller 220 is used to command the piezoelectric ultrasonic transducer 300 to emit a first ultrasonic wave (that is, the ultrasonic wave 302). The first ultrasonic wave penetrates the micromachined ultrasonic transducer 400 to be transmitted to the test object 50. In addition, the controller 220 is used to command the micromachined ultrasonic transducer 400 to emit a second ultrasonic wave (that is, the ultrasonic 402). The second ultrasonic wave is transmitted to the test object 50. The test object 50 reflects the second ultrasonic wave into the reflected wave 54, and the micromachined ultrasonic transducer 400 receives the reflected wave 54.

The ultrasonic transducing module 200 of the embodiment can achieve destructive treatment positioning to replace a part of the functions of computer tomography (CT) or magnetic resonance imaging (MRI). For example, the piezoelectric ultrasonic transducer 300 may be used as a high intensity focused or non-focused ultrasound therapeutic system, such as a HIFU ultrasonic knife, and may be a single array element or multi-array element transducer arranged in an array, and the micromachined ultrasonic transducer 400 may have array elements arranged in a one-dimensional array or a two-dimensional array and may execute real-time symptom calibration.

Figure 3:
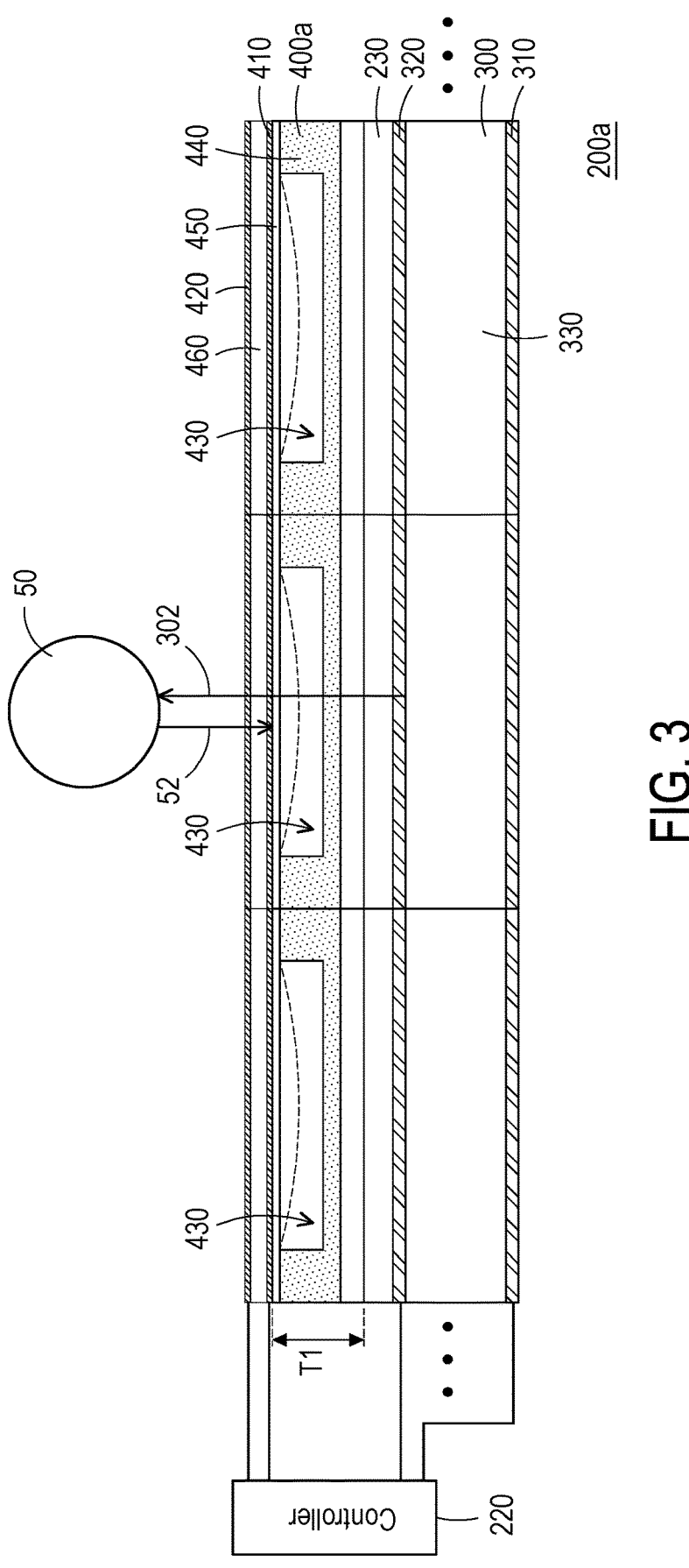
FIG. 3 is a cross-sectional schematic view of an ultrasonic transducing module according to another embodiment of the disclosure.

FIG. 3 is a cross-sectional schematic view of an ultrasonic transducing module according to another embodiment of the disclosure. Please refer to FIG. 3. An ultrasonic transducing module 200a of the embodiment is similar to the ultrasonic transducing module 200 of FIG. 2A, and the difference between the two is as follows. In the ultrasonic transducing module 200a of the embodiment, the micromachined ultrasonic transducer 400a is a piezoelectric micromachined ultrasonic transducer (PMUT) and includes the retaining wall 440, the third electrode 410, the fourth electrode 420, the thin-film 450, and a piezoelectric thin-film 460. The retaining wall 440 is formed with the micro-cavities 430. The third electrode 410 and the fourth electrode 420 are both located above the micro-cavities 430, the thin-film 450 spans over the micro-cavities 430, and the third electrode 410 is disposed on the thin-film 450. The piezoelectric thin-film 460 is disposed on the third electrode 410, and the fourth electrode 420 is disposed on the piezoelectric thin-film 460. When a voltage change is applied to the third electrode 410 and the fourth electrode 420, the piezoelectric thin-film 460 vibrates, and the thin-film 450 vibrates to emit an ultrasonic wave. On the other hand, when an ultrasonic wave from the outside is transmitted to the piezoelectric thin-film 460 to vibrate the piezoelectric thin-film 460, the voltage between the third electrode 410 and the fourth electrode 420 changes due to the piezoelectric effect, so that the third electrode 410 and the fourth electrode 420 output changing voltage signals. The controller 220 may sense and analyze the voltage change between the third electrode 410 and the fourth electrode 420, thereby achieving the sensing function of the external ultrasonic wave. In addition, the piezoelectric thin-film 460 and one of the third electrode 410 and the fourth electrode 420 may be divided into multiple units along with the micro-cavities 430 to form multiple array elements.

Furthermore, the piezoelectric ultrasonic transducer 300 and at least one of the micromachined ultrasonic transducers 400 and 400a may be used to send ultrasonic signals, and the piezoelectric ultrasonic transducer 300 and at least one of the micromachined ultrasonic transducers 400 and 400a may also be used to receive ultrasonic signals. Also, the ultrasonic signals sent and/or received by the piezoelectric ultrasonic transducer 300 and the micromachined ultrasonic transducers 400 and 400a may communicate with each other to achieve applications of various ultrasonic waves.

In summary, in the ultrasonic transducing module and the ultrasonic probe of the embodiments of the disclosure, the stacked piezoelectric ultrasonic transducer and micromachined ultrasonic transducer are adopted, and the piezoelectric ultrasonic transducer and the micromachined ultrasonic transducer may be used for sensing or outputting different ultrasonic waves. Therefore, the ultrasonic transducing module and the ultrasonic probe of the embodiments of the disclosure have a wide range of functions.

What is claimed is:
1. An ultrasonic transducing module, comprising:
a base;
a piezoelectric ultrasonic transducer, disposed on the base; and a micromachined ultrasonic transducer, disposed on the piezoelectric ultrasonic transducer, wherein the piezoelectric ultrasonic transducer is disposed between the base and the micromachined ultrasonic transducer, and an ultrasonic wave emitted by the piezoelectric ultrasonic transducer penetrates the micromachined ultrasonic transducer and is then transmitted to an outside.

2. The ultrasonic transducing module according to claim 1, wherein the micromachined ultrasonic transducer is a capacitive micromachined ultrasonic transducer or a piezoelectric micromachined ultrasonic transducer.

3. The ultrasonic transducing module according to claim 1, wherein the piezoelectric ultrasonic transducer is a lead zirconium titanate or single crystal ultrasonic transducer.

4. The ultrasonic transducing module according to claim 1, wherein the micromachined ultrasonic transducer is a thin-film micromachined ultrasonic transducer.

5. The ultrasonic transducing module according to claim 4, wherein a thickness of the thin-film micromachined ultrasonic transducer falls within a range of 1 micron to 10 microns.

6. The ultrasonic transducing module according to claim 4, wherein the micromachined ultrasonic transducer is flexible.

7. The ultrasonic transducing module according to claim 1, wherein the piezoelectric ultrasonic transducer is in a sheet shape.

8. The ultrasonic transducing module according to claim 1, wherein the piezoelectric ultrasonic transducer is curved.

9. The ultrasonic transducing module according to claim 1, further comprising a controller electrically connected to the piezoelectric ultrasonic transducer and the micromachined ultrasonic transducer, wherein the controller is used to command the piezoelectric ultrasonic transducer to emit the ultrasonic wave, the ultrasonic wave penetrates the micromachined ultrasonic transducer to be transmitted to a test object, the test object reflects the ultrasonic wave into a reflected wave, and the micromachined ultrasonic transducer receives the reflected wave.

10. The ultrasonic transducing module according to claim 1, further comprising a controller electrically connected to the piezoelectric ultrasonic transducer and the micromachined ultrasonic transducer, wherein the controller is used to command the piezoelectric ultrasonic transducer to emit a first ultrasonic wave, the first ultrasonic wave penetrates the micromachined ultrasonic transducer to be transmitted to a test object, the test object reflects the first ultrasonic wave into a first reflected wave, the piezoelectric ultrasonic transducer receives the first reflected wave, the controller is used to command the micromachined ultrasonic transducer to emit a second ultrasonic wave, the second ultrasonic wave is transmitted to the test object, the test object reflects the second ultrasonic wave into a second reflected wave, and the micromachined ultrasonic transducer receives the second reflected wave.

11. The ultrasonic transducing module according to claim 1, further comprising a controller electrically connected to the piezoelectric ultrasonic transducer and the micromachined ultrasonic transducer, wherein the controller is used to command the piezoelectric ultrasonic transducer to emit a first ultrasonic wave, the first ultrasonic wave penetrates the micromachined ultrasonic transducer to be transmitted to a test object, the controller is used to command the micromachined ultrasonic transducer to emit a second ultrasonic wave, the second ultrasonic wave is transmitted to the test object, the test object reflects the second ultrasonic wave into a reflected wave, and the micromachined ultrasonic transducer receives the reflected wave.

12. The ultrasonic transducing module according to claim 1, further comprising a matching layer disposed between the piezoelectric ultrasonic transducer and the micromachined ultrasonic transducer.

13. An ultrasonic probe, comprising:
a hand grip, having a first end and a second end;
a piezoelectric ultrasonic transducer, disposed on the first end of the hand grip; and
a micromachined ultrasonic transducer, disposed on the piezoelectric ultrasonic transducer, wherein an ultrasonic wave emitted by one of the piezoelectric ultrasonic transducer and the micromachined ultrasonic transducer closer to the second end penetrates other one of the piezoelectric ultrasonic transducer and the micromachined ultrasonic transducer further away from the second end and is then transmitted to an outside.

14. The ultrasonic probe according to claim 13, wherein the micromachined ultrasonic transducer is a capacitive micromachined ultrasonic transducer or a piezoelectric micromachined ultrasonic transducer.

15. The ultrasonic probe according to claim 13, wherein the micromachined ultrasonic transducer is a thin-film micromachined ultrasonic transducer.

16. The ultrasonic probe according to claim 13, wherein the micromachined ultrasonic transducer is flexible.

17. The ultrasonic probe according to claim 13, wherein the piezoelectric ultrasonic transducer is curved.

18. The ultrasonic transducer according to claim 13, wherein the piezoelectric ultrasonic transducer is disposed between the hand grip and the micromachined ultrasonic transducer.

19. The ultrasonic probe according to claim 18, further comprising a controller electrically connected to the piezoelectric ultrasonic transducer and the micromachined ultrasonic transducer, wherein the controller is used to command the piezoelectric ultrasonic transducer to emit the ultrasonic wave, the ultrasonic wave penetrates the micromachined ultrasonic transducer to be transmitted to a test object, the test object reflects the ultrasonic wave into a reflected wave, and the micromachined ultrasonic transducer receives the reflected wave.

20. The ultrasonic probe according to claim 13, further comprising a matching layer disposed between the piezoelectric ultrasonic transducer and the micromachined ultrasonic transducer.

* * * * *